United States Patent [19]

Stamps, Jr.

[11] Patent Number: 4,827,645

[45] Date of Patent: May 9, 1989

[54] ILLUMINATED TRASH RECEPTACLE

[75] Inventor: William E. Stamps, Jr., Hidden Hills, Calif.

[73] Assignee: Clean Scene Advertising, Inc., Los Angeles, Calif.

[21] Appl. No.: 895,133

[22] Filed: Aug. 11, 1986
(Under 37 CFR 1.47)

[51] Int. Cl.$^4$ ............................................. G09F 23/00
[52] U.S. Cl. ..................................................... 40/567
[58] Field of Search ................. 40/567, 566, 562, 902; 220/1 T; 362/812

[56] References Cited

U.S. PATENT DOCUMENTS

| | | | |
|---|---|---|---|
| 757,403 | 4/1904 | Leveen | 40/567 |
| 1,108,066 | 8/1914 | Cooke et al. | 220/1 T |
| 1,424,519 | 8/1922 | Richardson | 220/1 T |
| 1,645,870 | 10/1927 | Overton et al. | 40/567 |
| 1,816,974 | 8/1931 | Kavanagh | 40/567 |
| 1,837,447 | 12/1931 | Kenny | 40/567 |
| 2,490,790 | 12/1949 | Emerson | 220/1 T |
| 2,543,008 | 2/1951 | French | 40/567 |
| 3,059,102 | 10/1962 | Sherron | 40/902 |
| 3,947,985 | 4/1976 | Skrzypczak | 40/567 |
| 4,227,327 | 10/1980 | Thompson | 40/902 |
| 4,319,310 | 3/1982 | Kingsley | 362/812 |

FOREIGN PATENT DOCUMENTS 283364  1/1928  United Kingdom ................. 40/567

Primary Examiner—Gene Mancene
Assistant Examiner—Cary E. Stone
Attorney, Agent, or Firm—Philip D. Junkins

[57] ABSTRACT

A trash and waste material receptacle which includes outer side panels adapted for back-lit advertising and informational display. The receptacle includes an inner trash collection compartment designed to receive a disposable collection bag or a re-usable collection container. The trash collection compartment is spaced inwardly from the outer side panels of the receptacle thereby forming an annular space between the side panels and collection compartment for receiving lighting equipment for back-lighting the side panels. Electrical control equipment is provided within the trash receptacle below the trash collection compartment for controlling the lighting equipment. Electrical power for energizing the lighting equipment is provided from a source external to the receptacle or by one or more solar cell panels in replacement of one or more of the side advertising panels.

12 Claims, 4 Drawing Sheets

ILLUMINATED TRASH RECEPTACLE

BACKGROUND OF THE INVENTION

The present invention relates to trash and waste material receptacles. More particularly the invention relates to trash receptacles of the type that are commonly placed on sidewalks in areas bearing heavy pedestrian traffic and at points whereat adjacent businesses and/or recreational activities result in the generation of substantial amounts of waste materials, i.e., paper and plastic wrappings, empty bottles and drink containers, newspapers and entertainment programs and like materials. Trash receptacles of the type described are also appropriately placed throughout shopping plaza areas and enclosed shopping malls, as well as in sports, arenas, stadiums and parks.

In some instances trash receptacles have been used to carry advertising material or community health and safety information. Trash receptacles with outer advertising panels adapted to be slidably received in outside corner grooves are shown in U.S. Pat. Nos. 1,424,519; 1,424,520 and 2,490,790. Frequently, advertising matter and other information is applied to the outer wall of the receptacle by silk screen techniques at the point of manufacture of the receptacle. In either case the advertising matter or information is directly subject to weather damage and the application of graffiti.

OBJECTS AND SUMMARY OF THE INVENTION

It is an object of the present invention to provide trash receptacles for placement on sidewalks and public walkways and which have illuminated side panels for the display of advertising matter and community health and safety information.

It is a further object of the invention to provide trash receptacles which include back-lit display panels bearing interchangeable advertising and community interest information with such advertising and informational matter being protected from wear and damage.

It is a still further object of the invention to provide trash receptacles which include display panels for advertising and other information with such panels being back-lit for night-time illumination of the display panels.

It is another object of the present invention to provide trash receptacles which include one or more photovoltaic devices or solar cell panels for generating electrical energy for daytime battery storage and nighttime energization of lighting devices for back-lighting advertising display panels comprising one or more of the side walls of such receptacles.

In accordance with the invention there is provided a trash and waste material receptacle which includes outer side panels adapted for back-lit advertising and informational display. The receptacle includes an inner trash collection compartment designed to receive a disposable collection bag or a re-usable collection container. The trash collection compartment is spaced inwardly from the outer side panels of the receptacle thereby forming an annular space between the side panels and collection compartment for receiving lighting equipment for back-lighting the side panels. The floor of the trash collection compartment is spaced from the bottom wall of the receptacle to provide space for electrical equipment for controlling the lighting equipment. The trash collection compartment is provided at its upper periphery with security means to maintain such compartment within the receptacle and to seal the annular space containing lighting equipment and the bottom space containing control equipment against tampering and equipment theft. A removable or hinged top cover is provided for the trash receptacle with an opening through which trash and waste materials may be deposited and directed into the trash collection compartment and its included disposable collection bag or re-usable collection container. The top cover of the trash receptacle of the invention may include means for maintaining the collection bag or collection container in appropriate trash reception position within the receptacle and for protecting the trash deposite opening from rain or snow.

In a second embodiment of the trash and waste material receptacle of the present invention, one or more of the outer side panels of the receptacle may comprise a solar cell panel or photovoltaic panels for generating electrical energy for the day-time storage of such energy in one or more batteries which may be contained within the bottom space of the trash receptacle. In a further embodiment of the invention, a solar cell panel may be incorporated into the top cover of the trash receptacle. The illuminated trash receptacles of the invention may be rectangular (square) in configuration providing four side panels or may be pentagonal or hexagonal in configuration, respectively, providing five or six side panels for back-lit advertising display and utilization for one or more solar cell panels. Also, the trash receptacles may be of cylindrical configuration with arcuate panels for back-lit advertising display purposes and arcuate solar cell panels.

BRIEF DESCRIPTION OF THE DRAWINGS

Details of the invention, and of preferred embodiments thereof, will be further understood by reference to the drawings.

DETAILED DESCRIPTION OF THE PREFERRED EMBODIMENTS

Figures 1, 2, 2A:
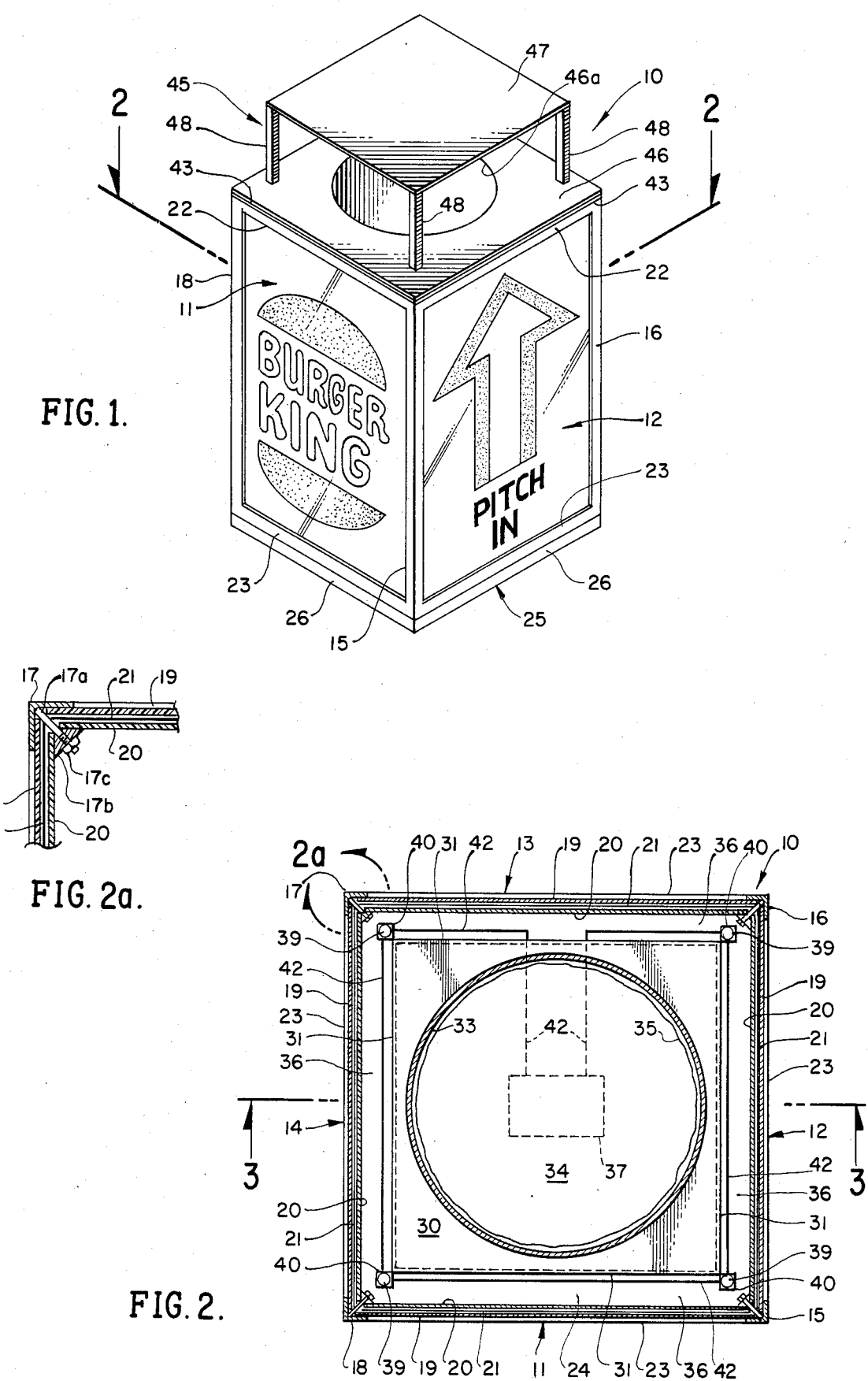
FIG. 1 is a perspective view of one form of the illumonated trash receptacle of the invention.
FIG. 2 is a horizontal section view of a first embodiment of the invention taken on line 2—2 of FIG. 1.
FIG. 2a is an enlarged partial section view of one corner of the trash receptacle of FIG. 2.

Referring now to FIGS. 1, 2, 2a and 3 there is shown a trash receptacle 10 in accordance with the present invention. The receptacle 10, which has the general configuration of trash receptacles commonly placed on sidewalks in areas bearing heavy pedestrian traffic, is provided with side panels 11, 12, 13 and 14 supported and maintained in their vertical orientation by corner angle supports 15, 16, 17 and 18. The side panels are each comprised of: an outer transparent sheet 19 of rigid, tough thermoplastic material (such as high impact polycarbonate); an inner transparent sheet 20 of like thermoplastic material; and an interposed, relatively thin sheet 21 of positive film transparency material bearing advertising matter of community health and safety informational matter. The inner thermoplastic sheet 20 of each panel structure or assembly acts to support and maintain the interposed transparency sheet 21 in close contact with the outer protective thermoplastic sheet 19. The panels are removably held to the corner angle supports of receptacle 10 by appropriate fixtures of the type shown in FIG. 2a for corner support 17. As shown in FIG. 2a the panel-holding fixture includes a bolt 17a (affixed to corner angle 17), corner locking piece 17b and retaining nut 17c. Each side panel of receptacle 10 is maintained in its respective position by top and bottom angle supports 22 and 23, respectively, which are affixed to corner angle supports 15, 16, 17 and 18 and cooperate with such corner supports to form the principal box-like structure of receptacle 10.

Figure 3:
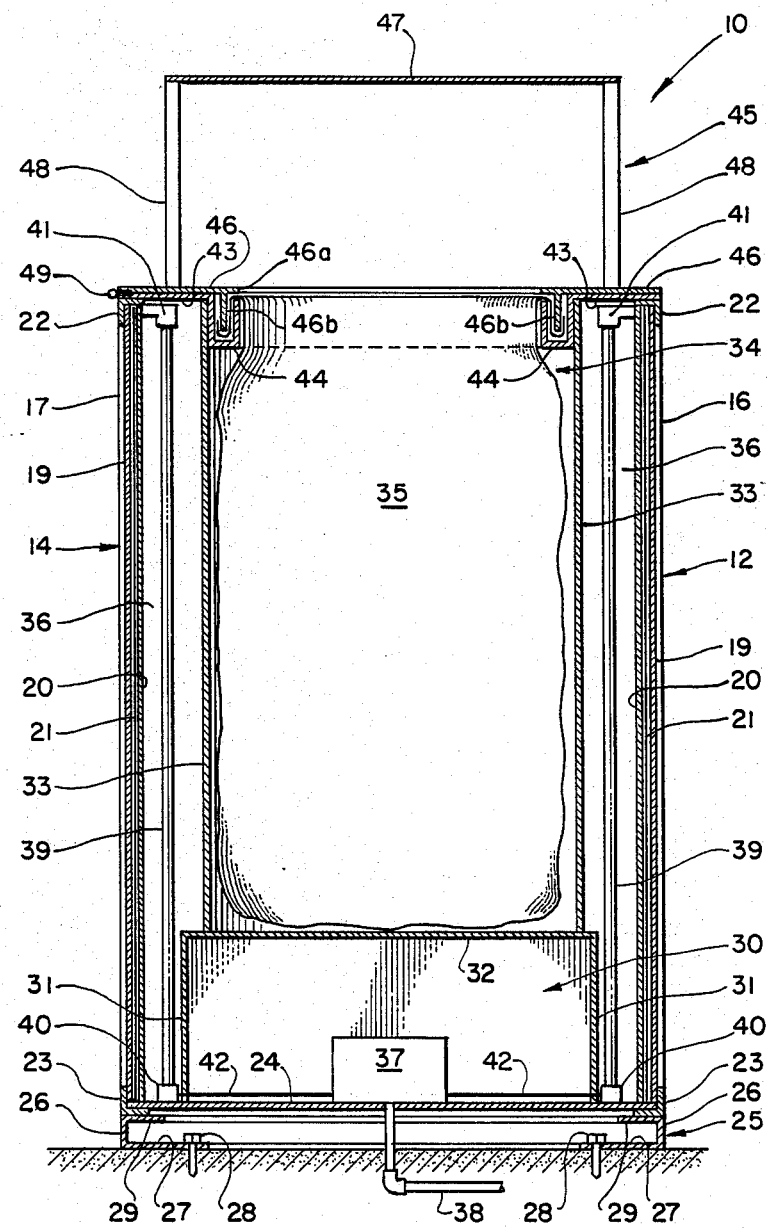
FIG. 3 is a vertical section view of the embodiment of FIG. 2 taken on line 3—3 of FIG. 2.

The trash receptacle 10 is provided with a bottom wall 24 which is affixed within bottom angle supports 23. Receptacle 10 is supported by, and affixed to, a rectangular ground frame 25 which is comprised of channel members 26 having bottom portions 27 for bolting or otherwise attaching the frame 25, and thus the trash receptacle 10, to the sidewalk on which the receptacle is located. As shown in FIG. 3, concrete bolts 28 (with leveling shims as may be required) are used to affix frame 25 to the sidewalk. Receptacle 10, via bottom wall 24, is affixed to top portions 29 of channel members 26 by any suitable means (not shown).

An electrical control compartment 30 is situated centrally within receptacle 10 on the bottom wall 24 and is comprised of side walls 31 and top wall 32. As shown in FIGS. 2 and 3 compartment 30 is rectangular with four side walls 31. Alternatively, the compartment 30 may be formed with a circular side wall. The top wall 32 of the electrical control compartment 30 supports an upwardly extending inner receptacle wall 33 which as shown in FIGS. 2 and 3 is circular in configuration, extends to the top of trash receptacle 10 and forms the internal space 34 which receives a disposable trash bag 35 (see FIG. 3). Alternatively, the inner receptacle wall 33 may be rectangular in cross section. In either case, the inner receptacle 33 is spaced from the side panel assemblies 11, 12, 13 and 14 and forms with such panels annular space 36 within which appropriate lighting equipment may be positioned for back lighting such side panels.

The electrical control compartment 30 encloses a lighting controller mechanism 37 of known design. The controller mechanism 37, including appropriate light timing devices, receives electric power from any convenient electrical power source. As shown in FIG. 3 electric power may be derived by subterranean power cable connector 38 fed by an adjacent street lighting system or other power source.

Within annular space 36, between side panel assemblies 11, 12, 13 and 14 and the side walls 31 of electrical compartment 30 and inner receptacle wall 33, are positioned lighting means comprised of fluorescent light tubes 39. As shown in FIGS. 2 and 3 the light tubes 39 are shown in vertical orientation within space 36 and are located at the four corner areas of such space and are supported at their lower ends by electrical connector brackets 40 and at their upper ends by support brackets 41. The electrical connectors 40 are appropriately connected to controller mechanism 37 by power cables 42. In some instances, where the configuration of the trash receptacle of the invention dictates, the fluorescent light tubes may be multiplied or decreased in number, may be fixed in horizontal or other orientation, or may be replaced by other back lighting means including incandescent lamps or fiber optic lighting systems.

At the upper end of inner receptacle wall 33 there is located an annular top wall 43 which is affixed to inner wall 33 and spans the upper end of annular space 36. The annular top wall 43 is appropriately locked to the upper structure of receptacle 10 (top angle supports 22) thereby sealing off annular space 36 and protecting the lighting equipment (light tubes 39) and advertising display sheets 21 from tampering and/or theft. The annular top wall 43 also maintains the lower electrical control compartment 30 in proper position protective of controller mechanism 37 and the power cables 42. As shown in FIG. 3, the annular top wall 43 includes an annular channel portion 44. This channel is provided where the innermost space 34 of the trash receptacle 10 is designed to receive a disposable trash bag 35. In such case the upper peripheral edge of the bag 35 is tucked into the channel and held in such position as described hereinafter.

Situated at the top of trash receptacle 10 is a cover assembly 45 (see FIGS. 1 and 3) which is comprised of receptacle closure member 46 (having a trash receiving opening 46a) and a rain bonnet 47 supported on legs 48. This particular cover assembly provides trash disposal access to the inside of receptacle 10 from four directions. Numerous other rain and snow protection cover arrangements may be utilized and the cover assembly of the type shown may be provided with push doors or flaps closing off the open areas defined by the cover member 46, bonnet 47 and legs 48. The cover member 46 is provided with hinge means 49 (see FIG. 3) and an annular depending flange 46b which, when the cover assembly 45 is closed, seats within annular channel 44 of top wall 43 and locks the upper peripheral edge of trash bag 35 so that the bag is maintained within trash receptacle 10 in full extension to receive trash deposited therein. On a regular basis the cover assembly is opened about its hinged edge and the filled trash bag is removed and replaced by a fresh bag. The trash receptacle 10 need not be limited to use of a disposable bag system. Rather, a reusable wire basket or plastic molded container may be utilized within the receptacle 10.

As previously indicated, the inner receptacle wall 33 (defining internal space 34), electrical control compartment 30 and annular top wall 43 combine to protect all of the electrical equipment, lighting equipment and advertising matter through locking means between top wall 43 and top angle supports 22. Also, appropriate seal means (not shown) are provided throughout the structure of trash receptacle 10 to protect all electrical, control and lighting items and advertising matter from water and moisture damage.

Figure 4:
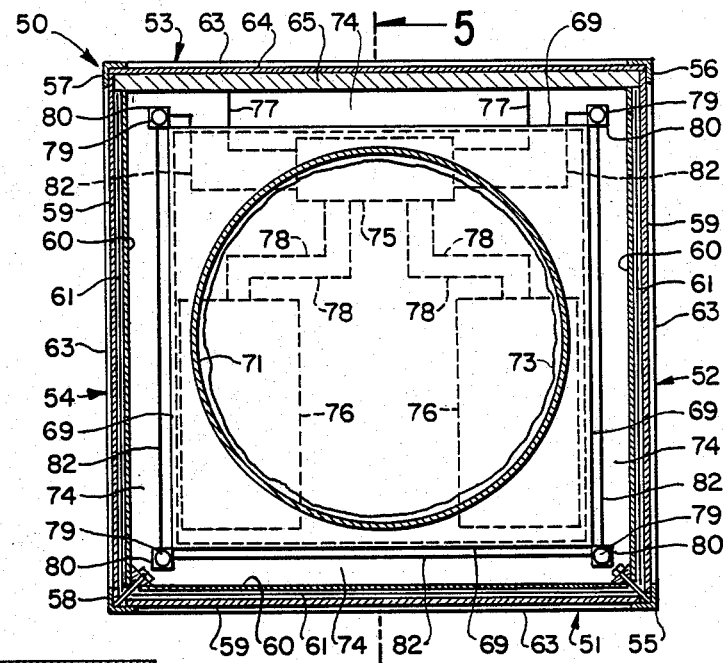
FIG. 4 is a horizontal section view of a second embodiment of the invention taken on line 2—2 of FIG. 1.
Figure 5:
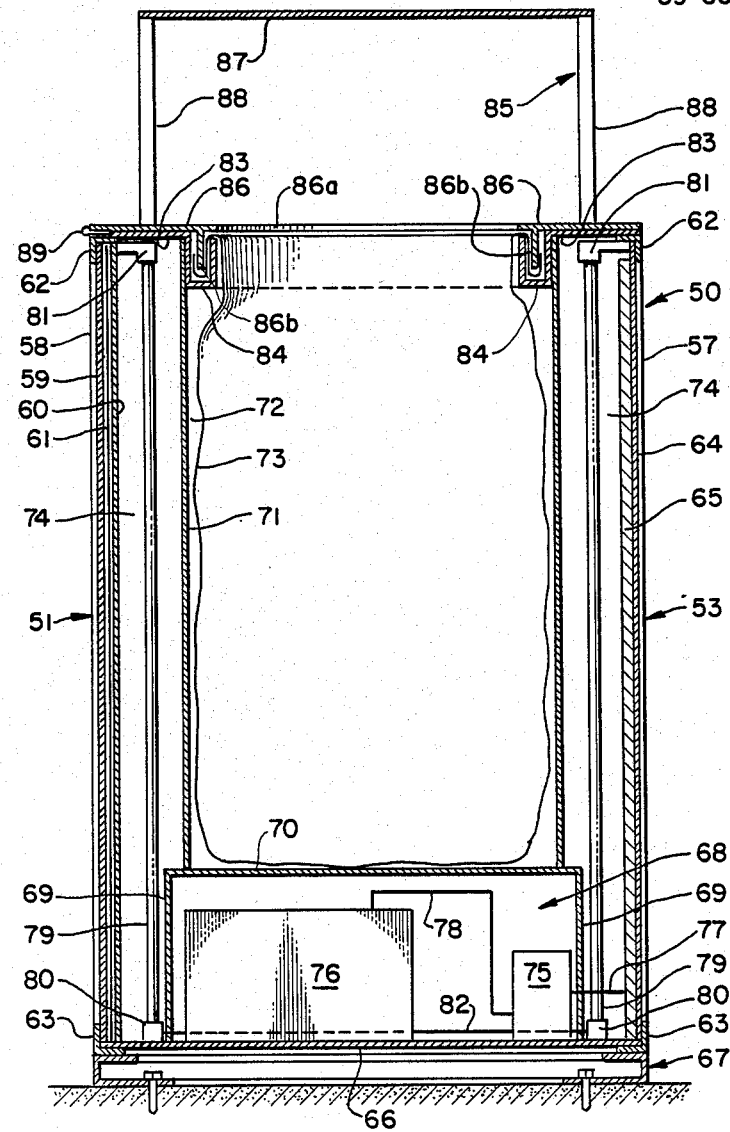
FIG. 5 is a vertical section view of the embodiment of FIG. 4 taken on line 5—5 of FIG. 4.

Referring now to FIGS. 4 and 5 there is shown a second embodiment of the invention wherein the electrical power for energizing the lighting equipment within the trash receptacle (thereby back lighting advertising panels associated with the receptacle) is generated through the use of a solar cell panel or photovoltaic panel comprising one of the sides of the receptacle. The trash receptacle 50, which again has the general configuration of trash receptacles commonly placed on sidewalks, is provided with side panels 51, 52, 53 and 54 supported and maintained in their vertical orientation by corner angle supports 55, 56, 57 and 58. Side panels 51, 52 and 54 are each comprised of: an outer transparent sheet 59 of rigid, tough thermoplastic material (such as high impact polycarbonate); an inner transparent sheet 60 of like thermoplastic; and an interposed, relatively thin sheet 61 of positive film transparency material bearing advertising matter or community health and safety information. The inner thermoplastic sheet 60 of each panel structure or assembly acts to support and maintain the interposed transparency sheet 61 in close contact with the outer protective sheet 59 with the inner sheet 60 removably affixed in its supporting position by fixtures (see FIG. 2a) of known type and design. Each display panel (51, 52 and 54) of receptacle 50 is maintained in its respective position by top and bottom angle supports 62 and 63, respectively, which are affixed to corner angle supports 55, 56, 57 and 58 and cooperate with such corner supports to form the principal box-like structure of receptical 50.

Side panel 53 of trash receptacle 50 is a solar energy receptor structure and is comprised of: an outer transparent sheet 64 of rigid, tough thermoplastic material; and an inner solar panel 65 comprised of a multiplicity of photovoltaic cells adapted to receive solar radiation through the outer transparent sheet 64. The solar panel 65 may, in fact, be comprised of one or more panels of the type supplied by Arco Solar of Chatsworth, Calif. or Kyocera Solar Products of San Diego, Calif. or by other fabricators of like panels. A typical Arco solar panel of the type utilized in a trash receptacle as shown in FIGS. 4 and 5 has the dimensions of 42.6" long, 13.0" wide, with a thickness of 1.4", and has power specifications of 42.0 watts, 2.9 amperes and 14.5 volts. A like Kyocera solar panel has the dimensions of 35.0" long, 18.0" wide, with a thickness of 1.4", and has power specifications of 40.0 watts, 2.7 amperes and 14.7 volts.

The trash receptacle 50 is provided with a bottom wall 66 which is affixed within bottom angle supports 63. Receptacle 50 is supported by, and affixed to, a rectangular ground frame 67 of design similar to the ground frame 25 of receptacle 10 as shown in FIG. 3. An electrical control compartment 68 is situated centrally within receptacle 50 on the bottom wall 66 and is comprised of side walls 69 and top wall 70. As shown in FIGS. 4 and 5 the compartment 68 is rectangular with four side walls 69. The top wall 70 of compartment 68 supports an upwardly extending inner receptacle wall 71 which as shown in FIGS. 4 and 5 is circular in configuration, extends to the top of trash receptacle 50 and forms the internal space 72 which receives a disposable trash bag 73 (see FIG. 5). Alternatively, the inner receptacle wall 71 may be rectangular in cross section. In either case, the inner receptacle wall 71 is spaced from the side panel assemblies 51, 52 and 54 and the solar panel assembly 53 and forms with such panels annular space 74 within which appropriate lighting equipment may be positioned for back lighting of panels 51, 52 and 54.

The electrical control compartment 68 encloses a lighting controller mechanism 75 of known design and electrical storage batteries 76. The controller mechanism 75 (including appropriate light timing devices, storage battery charging and discharging control systems and solar panel electric feed control systems) receives electrical energy from the solar panel 65 (generated by the panel's photovoltaic cells during their exposure to sun radiation) via power cables 77 and directs same to batteries 76 via power cables 78. The controller 75 keeps the electrical charge level of the batteries in balance and at maximum during daylight hours and thereafter, during evening hours, directs the timed electrical discharge of such batteries to electrify the back lighting equipment arranged in annular space 74 of the trash receptacle 50. The lighting equipment within space 74, as illustrated in FIGS. 4 and 5, is comprised of fluorescent light tubes 79. These light tubes are shown in vertical orientation within space 74 and are located at the four corner areas of such space, are supported at their lower ends by electrical connector brackets 80, and are supported at their upper ends by support brackets 81. The electrical connectors 80 are appropriately interconnected to controller mechanism 75 by power cables 82. As in the case of the trash receptacle illustrated in FIGS. 2 and 3, the fluorescent light tubes may be multiplied or decreased in number, may be fixed in horizontal or other orientation, or may be replaced by other back lighting means. The batteries utilized in trash receptacles incorporating solar energized back lighting may be long life, sealed type as produced by GNB Battery Co. of Langhorne, Pa. and sold by such company, at 12 volt rating, under the brand name "GBN Absolyte."

At the upper end of inner receptacle wall 71 there is located an annular top wall 83 which is affixed to the inner wall 71 and spans the upper end of annular space 74. The annular top wall 83 is appropriately locked to the upper structure of receptacle 50 (top angle supports 62) thereby sealing off annular space 74 and protecting the lighting equipment (light tubes 79), solar panel 65 and advertising display sheets 61 from tampering and/or theft. The annular top wall 83 also maintains the lower electrical control compartment 68 in proper position protective of controller mechanism 75, batteries 76 and the power cables 77, 78 and 82. As shown in FIG. 5, the annular top wall 83 includes an annular channel portion 84 which functions in the manner as previously described with respect to FIG. 3 to support the upper peripheral edge of the bag 73.

Situated at the top of trash receptacle 50 is a cover assembly 85 which is comprised of receptacle closure member 86 (with trash receiving opening 86a) and a rain bonnet 87 supported on legs 88. The closure member 86 is provided with hinge means 89 (see FIG. 5) and an annular depending flange 86b which cooperates with channel 84 of top wall 83 to lock the upper peripheral edge of trash bag 73 so that the bag is maintained within trash receptacle 50 in full downward extension to receive trash deposited therein. As in the case of the trash receptacle 10 illustrated in FIGS. 2 and 3, the solar back-lit embodiment of the present invention as shown in FIGS. 4 and 5 provides structure that is protective of all electrical equipment, lighting equipment and advertising matter through locking means between top wall 83 and top angle supports 62. Also, appropriate seal means (not shown) are provided throughout the structure of receptacle 50 to protect the electrical, control, battery and lighting items and advertising matter from water and moisture damage.

Figure 6:
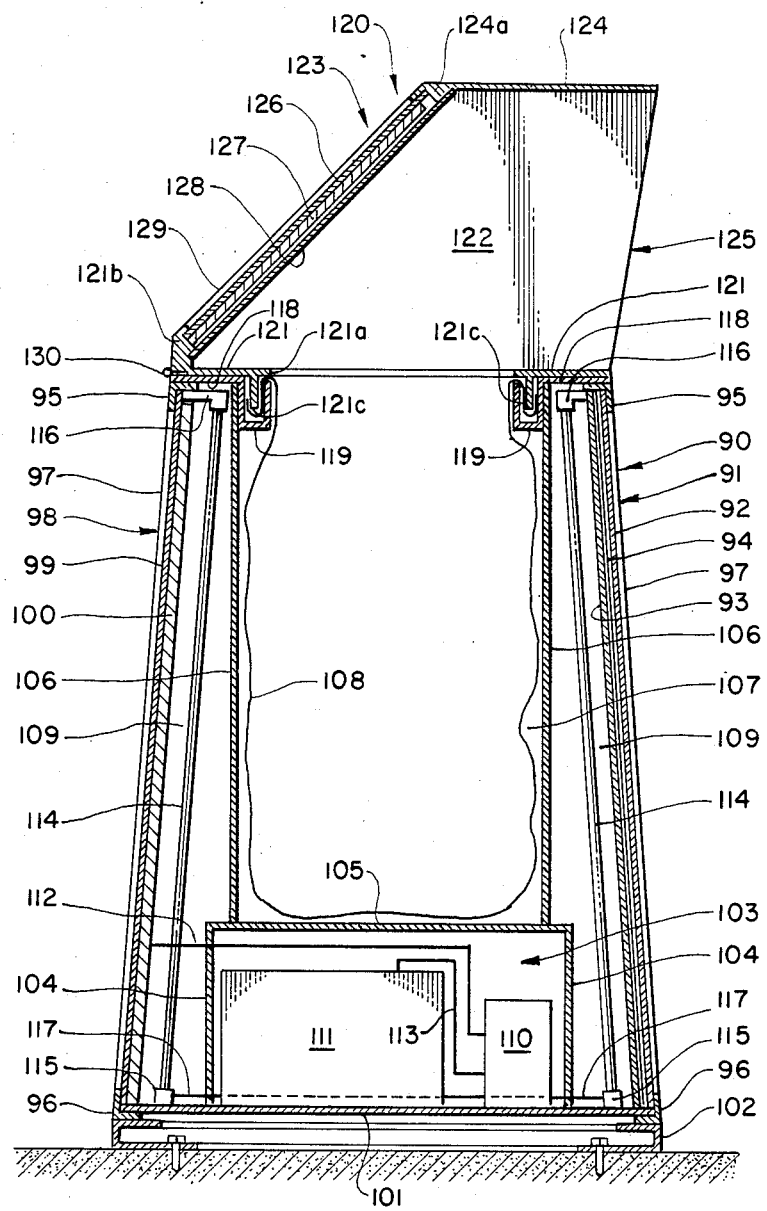
FIG. 6 is a vertical section view of a third embodiment of the invention.

Referring now to FIG. 6 there is shown a third embodiment of the invention wherein the structure of the trash receptacle is altered in some respects to provide additional surface area for the installation of solar panels. The trash receptacle 90, shown in a vertical section view, is rectangular in horizontal section and is provided with four side panel assemblies which slant inwardly from bottom to top. Three of the side panel assemblies (only one shown in the section view of FIG. 6) are display panels which include advertising matter or community information. The exemplary display panel 91 is comprised of: an outer transparent sheet 92 of rigid, tough thermoplastic material; an inner transparent sheet 93 of like thermoplastic material; and an interposed, relatively thin sheet 94 of positive film transparency material bearing advertising matter or community health and safety information. Each display panel assembly (including panel assembly 91) is maintained in its respective position by top and bottom angle supports 95 and 96, respectively, which are affixed to corner angle supports 97 and cooperate with such corner supports to form the principal structure of receptacle 90.

Side panel 98 of the trash receptacle 90 is a solar energy receptor structure and is comprised of: an outer transparent sheet 99 of rigid, tough thermoplastic material; an inner solar panel 100 comprised of a multiplicity of photovoltaic cells adapted to receive solar radiation through the outer transparent sheet 99. The inward slope of solar panel assembly 98 increases the solar energy reception efficiency (more direct radiation) of such assembly with respect to a vertical orientation of such an assembly. As in the case of the solar panel assembly 53 of FIGS. 4 and 5, panel assembly 98 may be comprised of one or mor solar panels.

The trash receptacle 90 is provided with a bottom wall 101 which is affixed within bottom angle supports 96. Receptacle 90 is supported by, and affixed to, a rectangular ground frame 102 of design similar to the ground frame 25 of receptacle 10 as shown in FIG. 3. An electrical control compartment 103 is situated centrally within receptacle 90 on the bottom wall 101 and is comprised of side walls 104 and top wall 105. The top wall 105 of compartment 103 supports an upwardly extending inner receptacle wall 106 which extends to the top of trash receptacle 90 and forms the internal space 107 which receives a disposable trash bag 108. The inner receptacle wall 106 is spaced from the side panel assemblies and forms with such panels an annular space 109 within which appropriate lighting equipment may be positioned for back lighting the display panels (including display panel 91).

The electrical control compartment 103 encloses lighting controller mechanism 110 and electrical storage batteries of which one (battery 111) is shown in FIG. 6. The controller mechanism 110 (including appropriate light timing devices, storage battery charging and discharging control systems and solar panel electric feed control systems) receives electrical energy from solar panel 100 (generated by such panel's photovoltaic cells during their exposure to sun radiation) via power cable 112 and directs same to the batteries (battery 111 shown) via power cable 113. As described hereinafter, the trash receptacle 90 illustrated in FIG. 6 has incorporated in its cover structure an additional solar panel assembly which is interconnected to controller mechanism 110 and also supplies electrical energy to the storage batteries within receptacle 90. The controller 110 keeps the electrical charge level of the batteries in balance and at maximum during daylight hours and thereafter, during evening hours, directs the timed electrical discharge of such batteries to electrify the back lighting equipment arranged in annular space 109 of the trash receptacle 90. The lighting equipment within space 109, as illustrated in FIG. 6, is comprised of fluorescent light tubes 114. These light tubes are shown in substantially vertical oriention within space 109 and are located at the four corner areas of such space, are supported at their lower ends by electrical connector brackets 115, and are supported at their upper ends by support brackets 116. The electrical connectors 115 are appropriately interconnected to controller mechanism 110 by power cables 117.

At the upper end of inner receptacle wall 106 there is located an annular top wall 118 which is affixed to the inner wall 106 and spans the upper end of annular space 109. The annular top wall 118 is appropriately locked to the upper structure of receptacle 90 (top angle supports 95) thereby sealing off annular space 109 and protecting the light tubes 114, solar panel 100 and advertising display sheet 94 (and other advertising display sheets on side panels not shown in FIG. 6) from tampering and/or theft. The annular top wall 118 also maintains the lower electrical control compartment 103 in proper position protective of controller mechanism 110, battery 111 (and other bateries as required) and the power cable 112, 113 and 117. As shown in FIG. 6, the annular top wall 118 includes an annular channel portion 119 which functions (as previously described) to support the upper peripheral edge of the trash bag 108.

Situated at the top of trash receptacle 90 is a cover assembly 120 which is comprised of receptacle closure member 121 (with trash receiving opening 121a). opposite side walls of which one side wall 122 is shown in FIG. 6, a sloping top solar panel assembly 123 and a top cover member 124. The closure member 121, side walls 122 and cover member 124 cooperate to define a trash receiving (pitch in) opening 125. The sloping top solar panel assembly 123 is comprised of: an outer transparent sheet 126 of rigid, tough thermoplastic material; an inner solar panel 127 comprised of a multiplicity of photovoltaic cells adapted to receive solar radiation through the outer transparent sheet; and an inner wall 128 protective of solar panel 127. The solar panel assembly 123 is maintained in its sealed and sloped arrangement as part of the cover assembly 120 by a lower support portion 121b of closure member 121 (and appropriate connector devices of known type and design) and an upper support portion 124a of cover member 124 together with side angle supports 129. The slope of solar panel assembly 123 increases the solar energy reception efficiency of such assembly. The closure member 121 is provided with hinge means 130 and an annular depending flange 121c which cooperates with channel 119 of top wall 118 to lock the upper peripheral edge of trash bag 108 so that the bag is properly maintained within trash receptacle 90. The solar panel 127 is interconnected electrically with controller mechanism 110 by appropriate power cables (not shown). The protective inner wall 128 in the cover assembly 120 is removable and provided with protective locking means so that access can be gained to solar panel 127. As in the case of the invention embodiments shown in FIGS. 1, 2, 3, 4, and 5, appropriate seal means (not shown) are provided throughout the recepacle structure to seal the structure against water and moisture.

In the specification and drawing figures there has been presented preferred embodiments of the present invention and although specific terms have been employed, they are used in a generic and descriptive sense only and not for purposes of limitation, the scope of the invention being defined in the following claims.

What is claimed is:

1. A combined trash collection receptacle and advertising display system comprising:
    (a) a main trash receptacle frame including a plurality of side panel support members extending upwardly from a bottom member of said frame and terminating in an open peripheral top member thereof;
(b) a plurality of advertising and information display panel assemblies each including a rigid and tough outer sheet of transparent material, a rigid and tough inner sheet of transparent material and an interposed sheet of positive film transparency material bearing advertising or informational matter, said panel assemblies being removably maintained between pairs of said panel support members and extending from the bottom member to the open peripheral top member of said main frame;
(c) at least one photovoltaic cell solar panel assembly including a rigid and tough outer sheet of transparent material and an inner solar panel comprised of a multiplicity of photovoltaic cells adapted to receive solar radiation through said outer sheet of transparent material and generate electrical energy, said solar panel assembly being removably maintained between a pair of said panel support members and extending from the bottom member to the open peripheral top member of said main frame;
(d) an annular wall positioned within said main receptacle frame, said wall being inwardly spaced from said display panel assemblies and said solar panel assembly and defining therewith an outer annular lighting space, and said wall itself defining a central trash reception zone within said main frame;
(e) electrical light producing equipment means within said annular lighting space for back lighting said display panel assemblies and thereby illuminating the positive film transparency material of said assemblies;
(f) electric storage battery means within said main frame below said central trash reception zone and isolated therefrom;
(g) control means interconnecting said solar panel assembly and said storage battery means and directing the storage of electrical energy generated by said solar panel assembly to said battery means for storage therein and interconnecting said battery means with said light producing equipment means for controlling and timing the supply of electrical energy from said battery means to said light producing equipment;
(h) an annular top wall spanning and enclosing the annular lighting space between the annular wall within said main receptacle and the peripheral top member of said main receptacle frame to protect the electrical light producing equipment means within said lighting space, said annular top wall having a central opening through which trash may be deposited within the central trash reception zone of said trash receptacle; and
(i) a removable trash collection container within said trash reception zone for receiving trash deposited within said zone through the central opening of the annular top wall of said main receptacle frame.

2. A combined trash collection receptacle and advertising display system as claimed in claim 1 wherein said main receptacle frame is rectangular in horizontal cross section and there are three of said display panel assemblies forming three like sides of said receptacle between panel support members thereof and there is one solar panel assembly forming one of the sides of said receptacle between panel support members thereof.

3. A combined trash collection receptacle and advertising display system as claimed in claim 1 wherein said main receptacle frame is pentagonal in horizontal cross section and there are three to four of said display panel assemblies forming three to four like sides of said receptacle between panel support members thereof and there are one to two solar panel assemblies forming one to two like sides of said receptacle between panel support members thereof.

4. A combined trash collection receptacle and advertising display system as claimed in claim 1 wherein said main receptacle frame is hexagonal in horizontal cross section and there are four to five of said display panel assemblies forming four to five like sides of said receptacle between panel support members thereof and there are one to two solar panel assemblies forming one to two like sides of said receptacle between panel support members thereof.

5. A combined trash collection receptacle and advertising display system as claimed in claim 1 wherein said main receptacle frame is circular in horizontal cross section and there are two to four of said display panel assemblies of arcuate shape forming like outer sides of said receptacle between panel support members thereof and there are one to two of said solar panel assemblies of arcuate shape forming like outer sides of said receptacle between panel support members thereof.

6. A combined trash collection receptacle and advertising display system as claimed in claim 1 wherein said removable trash collection container within said trash reception zone of said trash receptacle is an upwardly open disposable flexible plastic bag.

7. A combined trash collection receptacle and advertising display system as claimed in claim 1 wherein said removable trash collection container within said trash reception zone of said trash receptacle is an upwardly open reusable rigid plastic liner.

8. A combined trach collection receptacle and advertising display system as claimed in claim 1 wherein the electrical light producing equipment means within the annular lighting space for back lighting said display panel assemblies includes one or more fluorescent tubes.

9. A combined trash collection receptacle and advertising display system as claimed in claim 1 wherein there is associated with the annular top wall spanning and enclosing the annular lighting space a cover assembly including a rain bonnet providing trash deposite access to the trash reception zone of said trash receptacle while protecting said zone from rain and snow.

10. A combined trash collection receptacle and advertising display system as claimed in claim 9 wherein said cover assembly includes means cooperating with said annular top wall spanning and enclosing the annular lighting space to hold the upper peripheral edge of a disposable flexible plastic bag comprising the removable trash collection container within said trash reception zone of said trash receptacle.

11. A combined trash collection receptacle and advertising display system as claimed in claim 9 wherein said cover assembly is hinged to said annular top wall spanning and enclosing the annular lighting space.

12. A combined trash collection receptacle and advertising display system as claimed in claim 1 wherein there is associated with the annular top wall spanning and enclosing the annular lighting space a cover assembly comprised of: a secondary photovoltaic cell solar panel assembly including a rigid and tough outer sheet of transparent material and an inner solar pannel comprised of a multiplicity of photovoltaic cells adapted to receive solar radiation through said outer sheet of transparent material and generate electrical energy, and a top cover member with said cover assembly providing trash deposite access to the trash reception zone of said trash receptacle, said secondary solar panel assembly being disposed in a sloped orientation within said cover assembly for maximum solar energy reception.

* * * * *